United States Patent [19]

Dutilh

[11] Patent Number: 4,608,267

[45] Date of Patent: Aug. 26, 1986

[54] LECITHIN-CONTAINING FOOD PRODUCT

[75] Inventor: Christian E. Dutilh, Dordrecht, Netherlands

[73] Assignee: Thomas J. Lipton Inc., Englewood Cliffs, N.J.

[21] Appl. No.: 675,198

[22] Filed: Nov. 27, 1984

[30] Foreign Application Priority Data

Nov. 29, 1983 [GB] United Kingdom ............... 8331808

[51] Int. Cl.$^4$ ............................................. A23J 7/02
[52] U.S. Cl. ................................... 426/662; 426/800
[58] Field of Search ............... 426/531, 662, 609, 800; 260/403; 514/78

[56] References Cited

U.S. PATENT DOCUMENTS

| | | | |
|---|---|---|---|
| 2,057,695 | 10/1936 | Schwieger | 426/64 |
| 2,555,972 | 6/1951 | Karjala et al. | 426/662 |
| 2,773,771 | 12/1956 | Julian et al. | 426/662 |
| 2,849,318 | 8/1958 | Julian et al. | 426/662 |
| 2,910,362 | 10/1959 | Davis et al. | 426/662 |
| 3,268,335 | 8/1966 | Circle et al. | 426/634 |
| 3,357,918 | 12/1967 | Davis | 426/662 |
| 3,440,055 | 4/1969 | Cleary et al. | 426/662 |
| 3,661,795 | 5/1972 | Pardun | 426/662 |
| 3,920,857 | 11/1975 | Barker et al. | 426/662 |
| 4,022,923 | 5/1977 | Berger | 426/662 |
| 4,044,165 | 8/1977 | Baumann | 426/662 |
| 4,142,003 | 2/1979 | Sejpal | 426/662 |
| 4,188,412 | 2/1980 | Sejpal | 426/662 |
| 4,221,784 | 9/1980 | Growdon et al. | 514/78 |
| 4,346,084 | 8/1982 | Growdon et al. | 514/78 |
| 4,385,053 | 5/1983 | Reisberg et al. | 514/78 |

FOREIGN PATENT DOCUMENTS

| | | | |
|---|---|---|---|
| 517983 | 9/1981 | Australia . | |
| 0090454 | 10/1983 | European Pat. Off. | 514/78 |
| 107257 | 5/1984 | European Pat. Off. . | |
| 0146987 | 7/1985 | European Pat. Off. | 426/800 |
| 2948607 | 6/1981 | Fed. Rep. of Germany . | |
| 3230103 | 2/1984 | Fed. Rep. of Germany . | |
| 2386343 | 11/1978 | France . | |

OTHER PUBLICATIONS

J.A.O.C.S., vol. 58(10), 1981, W. van Nieuwenhuyzen, "The Industrial Uses of Special Lecithin", pp. 886-888.
Psychopharmacology Bulletin, vol. 20(3), 1984, J. H. Growdon et al., "Plasma Choline Responses to Lecithin-Enriched Soup", pp. 603-606.

*Primary Examiner*—R. B. Penland
*Attorney, Agent, or Firm*—Brumbaugh, Graves, Donohue & Raymond

[57] ABSTRACT

A food product which includes lecithin finely distributed therein, which lecithin includes at least 25% by weight of phosphatidyl choline,
0-20% by weight of phosphatidyl ethanolamine, and
fatty acid residues, of which residues at least 10% by weight are unsaturated fatty acid residues, which product includes at least 5% by weight of phosphatidyl choline, calculated on the dry contents of the product, wherein the weight ratio of the phosphatidyl choline and phosphatidyl ethanolamine contents of the product is at least 3, the balance consisting of edible material.

15 Claims, No Drawings

LECITHIN-CONTAINING FOOD PRODUCT

The present invention relates to a food product which includes lecithin.

Recent medical evidence that phosphatidyl choline may be of value in treating certain health problems and the growing popularity of health foods increased the need for palatable foods that contain a high level of phosphatidyl choline. Phosphatidyl choline may occur in substantial quantities in lecithin.

Lecithin can be obtained from a variety of sources, for example eggs, brain tissue, and plant seeds and beans, e.g. soybeans and sunflower seeds. Lecithin normally comprises a variety of phosphatides, in particular phosphatidyl choline (PC), phosphatidyl ethanolamine (PE), phosphatidyl inositol (PI) and phosphatidic acid (PA). For example, commercial soybean lecithin commonly comprises from about 50 to about 65% by weight of phosphatides, from about 30 to about 40% of triglycerides and other lipids and smaller amounts of other components, e.g. sugars, which phosphatides comprise mainly PC, PE, PI and PA, each of which is commonly present in amounts of from about 8% to about 20% by weight of the lecithin, and smaller amounts of other phosphatides, e.g. phosphatidyl serine.

According to U.S. Pat. No. 4,221,784 lecithin optimizes physiological functions and restores impaired physiological functions in situations associated with inadequate cholinergic transmission such as tardive dyskinesia, manicdepressive states or other psychiatric diseases, memory impairment, familial ataxias or the like. Lecithin is orally administered in amounts of between about 0.1 and 100 g/day. The dosages can be prepared by mixing the lecithin in foods.

In U S. Pat. No. 4,346,084 it is disclosed that choline or a physiologically acceptable natural or synthetic compound that dissociates to form choline, e.g. PC, when administered prior to or concomittantly with a drug can by increasing neuronal acetylcholine levels reduce or prevent undesirable side effects of the drug associated with inadequate acetylcholine release and/or potentiate the effectiveness of the drug. When lecithin is used as choline source it is administered in amounts of between about 0.1 and 100 g/day, usually between about 30 and 50 g/day.

The present invention provides a food product which includes lecithin finely distributed therein, which lecithin includes at least 25% by weight of PC, from 0 to 20% by weight of PE, and fatty acid residues, of which residues at least 10% by weight are unsaturated fatty acid residues, said food product including at least 5% by weight of PC calculated on the dry contents of the food product, wherein the weight ratio of the PC and PE contents of the food product is at least 3, the balance consisting of edible material.

By a food product is meant any product which as such, or after simple domestic treatment e.g. mixing with a liquid, for example fruit juice or water, and/or heating, is suitable for human consumption.

By PC is meant a compound having the formula

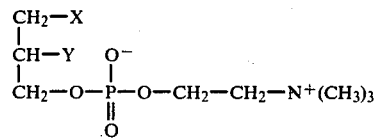

wherein X and Y can be the same or different and can be hydroxyl groups or fatty acid residues having up to 26 carbon atoms, usually 14–20 carbon atoms, or a salt thereof, e.g. a Ca or Mg salt. Thus, in this specification the indication PC includes both PC proper (both X and Y being a fatty acid residue) and lyso PC (either X or Y being a hydroxyl group, the other being a fatty acid residue).

Depending on the condition of the person, the desirable PC uptake per day can be quite substantial, e.g. as much as 10–50 g per day or even more. The caloric value of PC is similar to that of triglyceride oil. A group of people for whom PC uptake can be particularly advantageous are elderly people, who normally do not benefit from a diet with a high caloric value. It is highly desirable that PC is administered as part of the normal diet, wherein PC replaces e.g. some of the triglycerides and/or carbohydrates normally consumed rather than as an additive on top of the normal diet.

The presence of large amounts of phosphatides such as PE can have adverse effects in the body. This is one of the reasons why the weight ratio between the amounts of PC and PE in the food product should be at least 3, preferably at least 5. It is particularly preferred that this ratio is at least 10. The amount of PC in the product, calculated in % by weight on the total amount of phosphatides in the product, is preferably at least 50%. To reduce the risk of decalcification of the body due to the large intake of phosphoric acid residues, the product preferably comprises at least 3% by weight of calcium, calculated on the total amount of phosphatides. The calcium can be present in the form of calcium ions or as an edible calcium salt, e.g. calcium chloride.

To obtain a palatable product it is essential that the lecithin is finely distributed in the food product. Lecithin does not melt in the mouth. Lumps of lecithin in a food product can stick to the mouth, giving an unpleasant sensation.

Preferably the lecithin comprises at least 40% by weight of PC, more preferably at least 80% by weight of PC. The PE content of the lecithin is preferably 0–13%, more preferably 0–5% by weight. Preferably at least 25% by weight of the fatty acid residues of the lecithin are polyunsaturated fatty acid residues. Suitable lecithin can be fractionated soybean lecithin. Other lecithins which can also be used are fractionated cottonseed, rapeseed and sunflower lecithins.

Particularly suitable food products according to the present invention are cheese, meat products, in particular soft meat products such as sausages and pâté-type products, soups, which can be in a concentrated or dry form, bakery products, e.g. bread, crisp bread, cookies and cake mixes, sandwich spreads such as peanut butter, marmalade and chocolate spread, sauces and salad dressings and oils, margarine, drinks such as fruit and vegetable drinks, milk and chocolate, malt and coffee-flavoured drinks, which drinks can be in a concentrated or instant from, desserts, and sweets such as chocolate truffles and candy bars.

Preferably the food product comprises at least 5% by weight of protein, calculated on the dry content of the product. The presence of protein can improve the texture of the product.

To obtain a product having suitable organoleptic properties, the lecithin incorporated in the product preferably comprises less than 8% by weight of triglycerides. Lecithin can be defatted e.g. by extraction with acetone or methylacetate. The product preferably comprises from from 5 to 15% by weight of PC, calculated on the dry contents of the product.

Preferably the product includes a bitter tasting substance. Suitable products are for example chocolate or orange marmalade.

Preferred food products are drinks, concentrated drinks and instant drinks comprising e.g. fruit juice, preferably apple, grapefruit or pear juice, or fruit flavours. Vegetable juice, particularly tomato and/or celery juice, can be suitably used as well. Such products preferably comprise at least 50% by weight of fruit or vegetable ingredients, calculated on the dry contents of the product. Other suitable drinks are chocolate, malt and coffee-flavoured drinks.

Another especially suitable product is a flavoured and sweetened aqueous emulsion, which emulsion preferably comprises sugar or a sugar replacer. The presence of sugar can improve both the taste and the stability of such products. Such products can suitably be served as a dessert.

Such aqueous emulsions can conveniently be prepared by a process wherein from a solution comprising lecithin and an organic solvent, said solvent having a boiling point below that of water and said lecithin comprising less than 25% by weight of triglyceride oil, the organic solvent is substantially removed in the presence of water to yield an aqueous emulsion comprising lecithin. Preferably the lecithin comprises less than 15% of triglyceride oil. This process is especially suitable to prepare emulsions wherein the triglyceride content of the lecithin is less than 8% by weight.

An advantage of the present process is that the aqueous emulsion can be prepared easily without the need of vigorous stirring. It is very difficult to disperse dry lecithin with a low oil content in water.

The aqueous emulsion obtained is especially suitable for use in the food products of the invention. In food products prepared with the aqueous emulsion the lecithin can be distributed very finely.

It is preferred to use in the preparation of the food products, lecithin which comprises at least 25% by weight of PC, 0–13% by weight of PE, preferably 0–5% by weight of PE, and fatty acid residues of which at least 10% by weight are unsaturated fatty acid residues. However, owing to the high viscosity, dry lecithin having a low triglyceride oil content and a low PE content can be particularly difficult to handle.

In the preparation of lecithin having a composition as required for the food product of the invention, e.g. by fractionating soybean lecithin, the lecithin fraction is usually obtained as a solution in an organic solvent, e.g. methanol. When this solvent is removed, e.g. by evaporation, severe foaming can occur, especially when the evaporation has proceeded to the stage where the solution comprises less than about 5–10% of solvent, which renders it difficult to remove the residual solvent. An advantage of the process described above is that the organic solvent can be removed without severe foaming problems by ensuring that water is present, at least when removing the last part of the organic solvent.

The aqueous emulsion can conveniently be prepared by ensuring that the solution comprises 5–50% by weight, preferably 8–20% by weight of organic solvent. The organic solvent generally is an aliphatic hydrocarbon having from 4 to 8 carbon atoms, e.g. hexane, an alkanol having from 1 to 4 carbon atoms, or acetone or methylacetate. The preferred alkanols are methanol and ethanol. The water is suitably added to the solution before removal of the solvent therefrom in an amount of at least 30% by weight of the lecithin.

The organic solvent can suitably be removed by steam treatment at subatmospheric pressure. In doing so, malodorous components of the lecithin can be removed, whereby the organoleptic properties of the aqueous emulsions can be improved.

Water is preferably used in an amount sufficient to yield an aqueous emulsion comprising water and lecithin in a weight ratio of from 0.4:1 to 2:1, preferably from 0.6:1 to 1:1.

Preferably the lecithin to be incorporated in the food product is mixed with an anti-oxidant. It is particularly preferred to mix the lecithin with EDTA in an amount of 100–1000 ppm by weight, preferably 100–500 ppm by weight, and alpha-tocopherol in an amount of 1000–2000 ppm by weight of lecithin. Gamma- and delta-tocopherol can also be used. In products sensitive to oxidation, lecithins having a low content of threefold unsaturated fatty acid residues, e.g. cottonseed lecithins or partially hydrogenated soybean lecithins can also be used.

It can be advantageous to mix the aqueous emulsion with an edible acid. Suitable acids are e.g. lactic acid and hydroxy and fruit acids. Preferably acetic acid or citric acid is used. The presence of acid can improve both the stability of the aqueous emulsion and the organoleptic properties of products prepared with the aqueous emulsion.

For certain products it can be advantageous to use in the preparation of the food product a free-flowing powder which includes lecithin. Such powders can suitably be prepared by a process wherein an aqueous emulsion including lecithin is mixed with a carrier and then dried, preferably by spray-drying, said lecithin comprising at least 25% by weight of PC, 0–13% by weight of PE, less than 25% by weight of triglyceride oil and fatty acid residues of which at least 10% by weight are unsaturated fatty acid residues. Suitable carriers are carbohydrates and proteins, especially maltodextrins and milk proteins. The weight ratio of carrier and lecithin can suitably be chosen in the range of 20:80 to 40:60.

An advantage of this process is that it can provide a free-flowing powder which contains lecithin with a high PC content and low PE and oil contents. With such a powder it is easy to prepare a food product containing such lecithin, wherein the lecithin is distributed very finely. Usually, dry lecithin with high PC and low PE and oil contents is available only as a highly viscous sticky mass which is very difficult to process.

The free-flowing powder obtained is very suitable for use in the preparation of the food product of this invention.

Food products according to the present invention can also advantageously be incorporated in other food products. For example, bits of an extruded product having a high fibre and a high PC content, suitable in itself as breakfast cereal, can be incorporated in muesli or candy bars.

Alternatively, PC-rich products according to the present invention can be prepared by incorporating the lecithin in only part of the product. For example, to prepare a PC-rich pizza, all lecithin can be incorporated in the pizza dough base.

EXAMPLE 1

Commercial soybean lecithin was extracted with 90% aqueous ethanol. The alcohol-soluble fraction obtained was then fractionated over a silica gel column using a hexane-methanol mixture (98/2 v/v) and subsequently pure methanol as eluting agents. A fraction containing PC and lysoPC as the only phosphatides, dissolved in methanol, was collected and the methanol was removed therefrom. The dry matter obtained contained 70.8% by weight of PC and 9.4% by weight of lysoPC. Approximately 65% by weight of the fatty acid residues contained in the product were polyunsaturated residues.

Four loaves were baked using standard procedures and using for each loaf the following ingredients:
100 g flour
54 g water
2 g yeast
2 g salt Varying amounts of lecithin were incorporated in the loaf as indicated in Table 1. The lecithin was cut into small pieces and mixed with the flour before mixing in the other ingredients.

TABLE 1

|  | Composition | | | |
|---|---|---|---|---|
|  | 1 | 2 | 3 | 4 |
| Lecithin added (g) | — | 6.0 | 9.0 | 12.0 |
| wt. % PC (+ lysoPC) on dry matter | — | 5.0 | 7.3 | 9.4 |
| wt. % phosphatides on dry matter | — | 5.0 | 7.3 | 9.4 |

With compositions 1, 2 and 3 very good loaves were obtained having a high volume, fine crumb structure, normal colour and proper taste. The loaf obtained with composition 4 deviated slightly in colour, being a bit yellow, and had a somewhat coarser crumb structure, but was still quite acceptable.

Another lecithin product was prepared by carrying out the fractionation as described above, but adding some water to the solution of lecithin in methanol before all methanol was removed therefrom. Solvent was then evaporated at sub-atmospheric pressure until all methanol was removed. To the resulting aqueous emulsion, 25 wt. % of maltodextrin, calculated on the amount of lecithin in the emulsion, was added and the mixture was spray-dried.

A loaf was baked as described above but using 15 g of the powder and 97 g instead of 100 g flour. The loaf obtained was very similar to that obtained with composition 4. Using the powder, however, it was easier to achieve a proper distribution of the lecithin in the dough.

For comparison loaves were baked following the same procedure as described above but using unfractionated commercial soybean lecithin which contained 12.7 wt. % PC, 10.8 wt. % PE, 14.3 wt. % PA and 8.7 wt. % PI. Loaves were baked containing 15 g and 20 g lecithin. Even when using 20 g, the PC content, calculated on dry matter was only 2.3 wt. %. Both loaves obtained were very poor. Large holes occurred in the crumbs, the crust was very dark and the volume was too low.

EXAMPLE 2

Chocolate truffles were prepared, using the ingredients listed in Table 2 as follows:

The chocolate was melted and mixed with the other ingredients. The butter was melted before it was mixed in. With compositions 2 and 3 the lecithin was cut into small pieces and heated (with composition 2 together with the butter). When all ingredients had been added, the mixture was beaten for a few minutes and chilled overnight. The mixture was then moulded into balls and rolled in chocolate vermicelli.

TABLE 2

|  | Composition | | |
|---|---|---|---|
|  | 1 | 2 | 3 |
| Dark chocolate (g) | 227 | 227 | 227 |
| Evaporated milk | 30 | 30 | 30 |
| Rum essence | 5 | 5 | 5 |
| Egg yolk | 40 | 40 | 40 |
| Unsalted butter | 57 | 41 | — |
| Lecithin* | — | 16 | 57 |

*The lecithin was prepared by fractionating commercial soybean lecithin over a silica gel column using a hexane-methanol (95/5 vol. %) mixture and subsequently pure methanol as eluting agents. After removal of the solvent from the PC fraction, a highly viscous mass was obtained which contained 92% by weight of PC and 2% by weight of PE. About 85% by weight of the fatty acid residues were unsaturated residues, about 65% being polyunsaturated residues. The PC-content of the product, PC/PE ratio and the PC content as % by weight of the total amount of phosphatides (taking to account the phosphatides contents of all ingredients) are shown in Table 3.

TABLE 3

|  | Composition | | |
|---|---|---|---|
|  | 1 | 2 | 3 |
| PC (wt. % on dry contents) | 0.9 | 5.4 | 16.8 |
| PC/PE ratio | 4 | 16 | 29 |
| PC/total phosphatides × 100% | 70 | 92 | 96 |

The truffles prepared with all three compositions tasted good. Since in compositions 2 and 3 the lecithin was used as a partial or complete replacement of the butter, the caloric contents of the truffles prepared with the three compositions were similar.

EXAMPLE 3

200 g of wheat bran and 25 g of honey were thoroughly mixed with 25 g of the lecithin described in Example 2, which lecithin had been cut into fine pieces. The mixture was extruded at 150° C. under high pressure, and the extruded material was cut into bits. The bits could suitably be eaten as breakfast cereal with milk.

EXAMPLE 4

Candy bars were prepared by mixing 110 g of oat flakes, 75 g of sugar, 30 g of dried coconut, 30 g of sesame seed, 2 g of salt, 20 g of hazelnut nibs and 100 g of the bits of Example 3 and adding 15 g of warm molasses, 15 g of warm honey, 110 g of oil and 3 g of vanilla extract. The mixture was thoroughly mixed and moulded into bars. After cooling down, the bar was a pleasant crunchy product.

Agreeable bars were also prepared by the same procedure but using instead of 110 g oil, 97 g oil with 13 g of the lecithin described in Example 2 dispersed therein.

EXAMPLE 5

Pâté was prepared from the following ingredients:
350 g lean pork meat
350 g fat pork belly meat
350 g pork liver
80 g finely chopped onion
50 g butter
40 g brandy
15 g salt
50 g wheat flour
100 g lecithin as described in Example 2, cut into fine pieces
100 g lard
20 g seasoning All meat was chopped into small pieces, mixed with the lecithin and passed through a mincing machine. The onion was fried in the butter and the brandy was added. After heating this mixture for a few minutes, all other ingredients were mixed in. The mixture was put in a dish and left to stand for 2 hours. Subsequently the dish was put in a hot water bath and kept in an oven at 150° C. for 2 hours. It was then allowed to cool down and stored for 24 hours at 4° C. The pâté tasted very good.

Taking into account the amounts of phosphatides present in the meat ingredients, the pâté contained approximately 12 wt. % of PC calculated on dry contents. The PC/PE ratio was approximately 18. The PC content calculated as % by weight on the total amount of phosphatides was approximately 87%.

The experiment was repeated, using a different kind of lecithin. The preparation of the lecithin was carried out as described in Example 2. When the removal of the solvent from the PC-enriched fraction had proceeded until the solution contained 15 wt. % of methanol, 100 wt. % of water was added. Subsequently the remainder of the solvent was removed by evaporation at reduced pressure, yielding an aqueous solution containing the lecithin. Subsequently 25 wt. %, calculated on the lecithin content of the emulsion, of milk protein was mixed in, and the mixture was spray-dried. A free-flowing powder was obtained containing 20 wt. % protein, 74 wt. % PC and 1.6 wt. % PE.

The pâté was prepared with 100 g of the free-flowing powder. In the end-product no differences were noted, compared with the other pâté. However, it was more convenient to prepare the pâté with the powder, since proper distribution of the lecithin could be achieved much more easily.

Crude rapeseed lecithin was extracted with aqueous ethanol and fractionation with a silica gel column, using the same procedure as described in Example 1 for soybean lecithin. The lecithin obtained contained 78 wt. % of PC and 2 wt. % of PE. A pâté was prepared with 100 g of this lecithin, following the same procedure as described above. An agreeable product was obtained.

A similar pâté was prepared, using still another lecithin product. Commercial soybean lecithin was extraced with ethanol that contained 10 vol. % of water. To the alcoholic phase some soybean oil and calcium chloride dissolved in a small amount of water were added. The mixture was homogenized and the solvent was removed. Owing to the presence of the calcium chloride and the additional oil, the product was a liquid which was easily pourable. It contained about 40 wt. % oil, 43 wt. % PC, 7 wt. % PE and 3 wt. % calcium.

The total phosphatide content was 54 wt. %. Using 100 g of this lecithin product, a pâté was obtained which contained approximately 6 wt. % PC calculated on dry matter, having a PC/PE weight ratio well above 10. The PC and calcium contents, calculated on the total amount of phosphatides, were above 70 wt. % and 3 wt. %, respectively.

EXAMPLE 6

Green pea soup was prepared from the following ingredients:

| | |
|---|---|
| Pea powder | 65 g |
| Starch | 30 g |
| Hydrogenated vegetable fat | 25 g |
| Maltodextrin | 30 g |
| Salt | 10 g |
| Monosodium glutamate | 1 g |
| Herbs and spices | 2 g |
| Vegetable powder | 5 g |
| Stock powder | 12 g |

These ingredients were mixed together and stirred in 1.3 l water.

An aqueous emulsion of lecithin was prepared as described in Example 1 and the water content was adjusted to obtain a water to lecithin weight ratio of 2:1. 36 g of this mixture was mixed with the soup. The soup was heated while stirring.

The soup tasted very good. It contained 5 wt. % of PC on dry matter. No distinction was observed between this soup and soup prepared from the same ingredients but without the lecithin.

EXAMPLE 7

An instant pea soup was prepared, using the same ingredients as in Example 6 but using 27 g instead of 30 g maltodextrin. 15 g of the lecithin-containing powder described in Example 1 was added. The ingredients were mixed and packed. From this instant soup 1.5 l excellent green pea soup could be prepared by mixing the instant soup in 1.3 l water and cooling it for a few minutes.

EXAMPLE 8

An instant tomato soup was prepared from the following ingredients:

| | |
|---|---|
| Tomato powder | 10 g |
| Hydrogenated vegetable fat | 6 g |
| Corn starch | 17 g |
| Sugar | 5 g |
| Vegetable powder | 3 g |
| Herbs and spices | 0.7 g |
| Monosodium glutamate | 1 g |
| Meat aroma | 0.3 g |
| Stock powder | 3 g |
| Salt | 7.5 g |
| Lecithin powder* | 4.8 g |

*The lecithin powder described in Example 1 was used.

The instant soup contained 5 wt. % PC on dry matter. From 1 package 1 liter of pleasant tasting tomato soup could be prepared.

EXAMPLE 9

A curry sauce was prepared as follows.
The following mixtures were prepared:

| | | |
|---|---|---|
| (A) | Malt vinegar | 31 g |
| | Sugar | 90 g |

| | | |
|---|---|---|
| | Salt | 20 g |
| | Citric acid | 1 g |
| | Sorbic acid | 1.8 g |
| | EDTA powder | 0.07 g |
| | Gelling agent | 32 g |
| | Water | 340 g |
| (B) | Red wine vinegar | 34 g |
| | Herbs and spices | 10 g |
| | Curry powder | 5 g |
| | Ginger powder | 0.5 g |
| | Apple sauce | 50 g |
| | Water | 60 g |
| (C) | Soybean oil | 243 g |
| | Egg yolk powder | 24 g |

Mixtures A and B were separately heated to 90° C., kept at that temperature for 5 minutes and cooled down. 50 g of the lecithin described in Example 1, comprising 80.3% PC was cut into small pieces and thoroughly mixed with mixture A.

Mixture A was then added to mixture C. This mixture was passed through a colloid mill and subsequently mixed with mixture B. A very fine tasting sauce was obtained which contained 8% PC calculated on dry matter.

A similar sauce was prepared, using the same procedure but different lecithin. Commercial soybean oil was desugared by extraction with 55% aqueous ethanol, fractionated by extraction with 90% aqueous ethanol and defatted by extraction with methylacetate. The dried product obtained contained 54.3% PC and 14.8 wt. % PE, the total phosphatides content being about 76 wt. %.

Using 50 g of this lecithin, a fine tasting curry sauce was obtained which contained more than 5% by weight of PC, calculated on dry contents.

For comparison it was tried to produce a similar sauce using 50 g of unfractionated commercial soybean lecithin as described in Example 1. However, no stable product could be obtained.

EXAMPLE 10

65 g of lecithin comprising 80.3% PC as described in Example 1, was cut into small pieces and thoroughly mixed with 715 g ground roasted peanuts. From this mixture and 200 g vegetable oil, 10 g salt and 10 g emulsifier, peanut butter was prepared, using standard procedures. A good tasting product was obtained. Taking into account the amounts of phosphatides present in the peanuts, the PC content of the product was approximately 5.6 wt. % on dry matter, the PC content calculated on the total amount of phosphatides was about 95% and the PC/PE weight ratio was well above 100.

Peanut butter was also prepared, following the same recipe but using only 8 g salt and further including 5.5 g calcium chloride. Agreeable peanut butter was obtained which contained about 3.5 wt. % of calcium calculated on the total amount of phosphatides.

EXAMPLE 11

An instant milk drink was prepared by mixing 100 g of skimmed milk powder with 8 g of the lecithin-containing powder described in Example 5.

Upon mixing 10 g of this instant drink with 90 g water, a pleasant milk-like drink was obtained which contained 5.5 wt. % of PC on dry matter and 20 wt. % of calcium calculated on the total amount of phosphatides.

Other agreeable instant drinks were prepared by incorporating in the instant mixture described above, small amounts of cocoa and sugar or strawberry flavour. The chocolate drink could suitably be used either hot or cold.

For comparison it was tried to prepare an instant milk product having a PC content of 5% by weight on dry matter, using commercial lecithin as described in Example 1. No proper product could be obtained.

EXAMPLE 12

Three series of cookies were baked, each series being made from the following ingredients:
110 g flour
75 g margarine
50 g sugar
10 g egg
1 g salt
0.4 g baking powder To each series an amount of lecithin was added as indicated in Table 4. The lecithin, described in Example 1 comprising 80.3 wt. % of PC, was cut into small pieces and mixed with flour. Then a dough was prepared and the cookies were baked in the oven, using standard procedures.

TABLE 4

| | Composition | | |
|---|---|---|---|
| | 1 | 2 | 3 |
| Lecithin (g) | 14 | 22 | 31 |
| PC content (wt. % on dry matter) | 5.0 | 7.6 | 10.3 |
| Total phosphatides (wt. %) | 5.0 | 7.6 | 10.3 |

Although the dough was somewhat difficult to handle and the cookies were a bit crumbly, the taste of the cookies was agreeable.

For comparison it was tried to bake cookies with commercial lecithin as described in Example 1. When using 55 g of this lecithin in the recipe given above to obtain a total phosphatides content of 10.2 wt. % on dry matter, i.e. essentially the same as in composition 3 (although the PC content would only be 2.6 wt. %), the cookies turned black and did not retain their shape but flowed out over the baking plate.

EXAMPLE 13

An aqueous emulsion of lecithin was prepared as described in Example 1. The water content was adjusted to obtain a water to lecithin weight ratio of 1:1. To 100 g of this emulsion 10 g of sugar and 5 g of lemon juice were added. The mixture was whipped for about 5 minutes. The volume increase due to incorporation of air was approximately 50%. The product was eaten as a dessert. It contained about 65 wt. % of PC on dry matter.

EXAMPLE 14

A PC-rich tomato juice concentrate was prepared by mixing 100 g of tomato juice concentrate containing 70 wt. % water with 5 g of an aqueous lecithin emulsion as described in Example 1, which contained 50 wt. % of water. The concentrate obtained contained 6 wt. % PC on dry matter.

A pleasant tomato juice drink was obtained by mixing 30 g of the concentrate with 90 g water.

I claim:

1. A food product which includes lecithin finely distributed therein, which lecithin consists essentially of
   at least 25% by weight of phosphatidyl choline,
   0-20% by weight of phosphatidyl ethanolamine, and
   fatty acid residues, of which residues at least 10% by weight are unsaturated fatty acid residues, which product includes at least 5% by weight of phosphatidyl choline, calculated on the dry contents of the product, wherein the weight ratio of the phosphatidyl choline and phosphatidyl ethanolamine contents of the product is at least 3, the balance consisting of edible material.

2. A product according to claim 1, wherein the lecithin includes 0-13% by weight of phosphatidyl ethanolamine.

3. A product according to claim 1, wherein the lecithin includes at least 40% by weight of phosphatidyl choline.

4. A product according to claim 3, wherein the lecithin includes at least 80% by weight of phosphatidyl choline.

5. A product according to claim 2, wherein the lecithin includes 0-5% by weight of phosphatidyl ethanolamine.

6. A product according to claim 1, wherein at least 25% by weight of the fatty acid residues of the lecithin are poly-unsaturated fatty acid residues.

7. A product according to claim 1, wherein the lecithin comprises less than 8% by weight of triglycerides.

8. A product according to claim 1, wherein the amount of phosphatidyl choline, calculated in % by weight on the amount of phosphatides, is at least 50%.

9. A product according to claim 1, wherein the weight ratio of the phosphatidyl choline and phosphatidyl ethanolamine contents of the product is at least 5.

10. A product according to claim 9, wherein the weight ratio of the phosphatidyl choline and phosphatidyl ethanolamine contents of the product is at least 10.

11. A product according to claim 1, which includes at least 3% by weight of calcium, calculated on the total amount of phosphatides.

12. A product according to claim 1, which includes 5-15% by weight of phosphatidyl choline, calculated on the dry contents of the product.

13. A product according to claim 1, which includes at least 5% by weight of protein, calculated on the dry contents of the product.

14. A product according to claim 1, which further includes a bitter tasting substance.

15. A product according to claim 1, which comprises at least 50% by weight of fruit or vegetable ingredients, calculated on the dry contents of the product.

* * * * *